United States Patent [19]

Bobard et al.

[11] 4,214,427
[45] Jul. 29, 1980

[54] MECHANICAL GRAPE HARVESTING DEVICE

[75] Inventors: Charles E. Bobard, Beaune; Just M. Dalaunay, Gevrey Chamberlin; Raymond M. Darcy, Beaune, all of France

[73] Assignee: Establissments Bobard Jeune, Beaune, France

[21] Appl. No.: 754,748

[22] Filed: Dec. 27, 1976

[30] Foreign Application Priority Data

Dec. 29, 1975 [FR] France ................ 75 39935

[51] Int. Cl.² .......................... A01D 46/00
[52] U.S. Cl. ................................. 56/330
[58] Field of Search .......... 56/330, 328 R, 130, 56/35, 13.5

[56] References Cited

U.S. PATENT DOCUMENTS

| | | | |
|---|---|---|---|
| 172,428 | 1/1876 | Haddock | 74/600 |
| 309,575 | 12/1884 | Sharpnack et al. | 74/600 |
| 1,769,568 | 7/1930 | Goodrich | 74/600 |
| 1,778,587 | 10/1930 | Crumley | 56/35 |
| 1,814,761 | 7/1931 | Mitchell | 56/13.5 |
| 1,949,510 | 3/1934 | Woodward | 74/600 |
| 1,986,012 | 1/1935 | Patterson | 74/600 X |
| 2,447,122 | 8/1948 | Horst, Jr. | 56/130 |
| 3,306,013 | 2/1967 | Whitman | 56/13.5 |
| 3,601,964 | 8/1971 | Fisher et al. | 56/330 |
| 3,688,482 | 9/1972 | Horn | 56/330 |
| 3,726,071 | 4/1973 | Mecca | 56/330 |
| 4,016,711 | 4/1977 | Claxton | 56/330 |

FOREIGN PATENT DOCUMENTS

| | | | |
|---|---|---|---|
| 1320150 | 6/1973 | United Kingdom | 56/330 |
| 402350 | 5/1974 | U.S.S.R. | 56/330 |

Primary Examiner—Russell R. Kinsey
Attorney, Agent, or Firm—Darby & Darby

[57] ABSTRACT

A mechanical grape harvester including a support on which is mounted a plurality of blades. The support is moved to cause the blades to travel a path defined by a closed curve in a vertical plane generally perpendicular to the row of vine, using ascending in the portion of the path closest to the grapes to be harvested and descending in the portion of the path farthest away from the grapes. It is preferred that the blades be flexible in the horizontal direction and rigid in the vertical direction.

29 Claims, 18 Drawing Figures

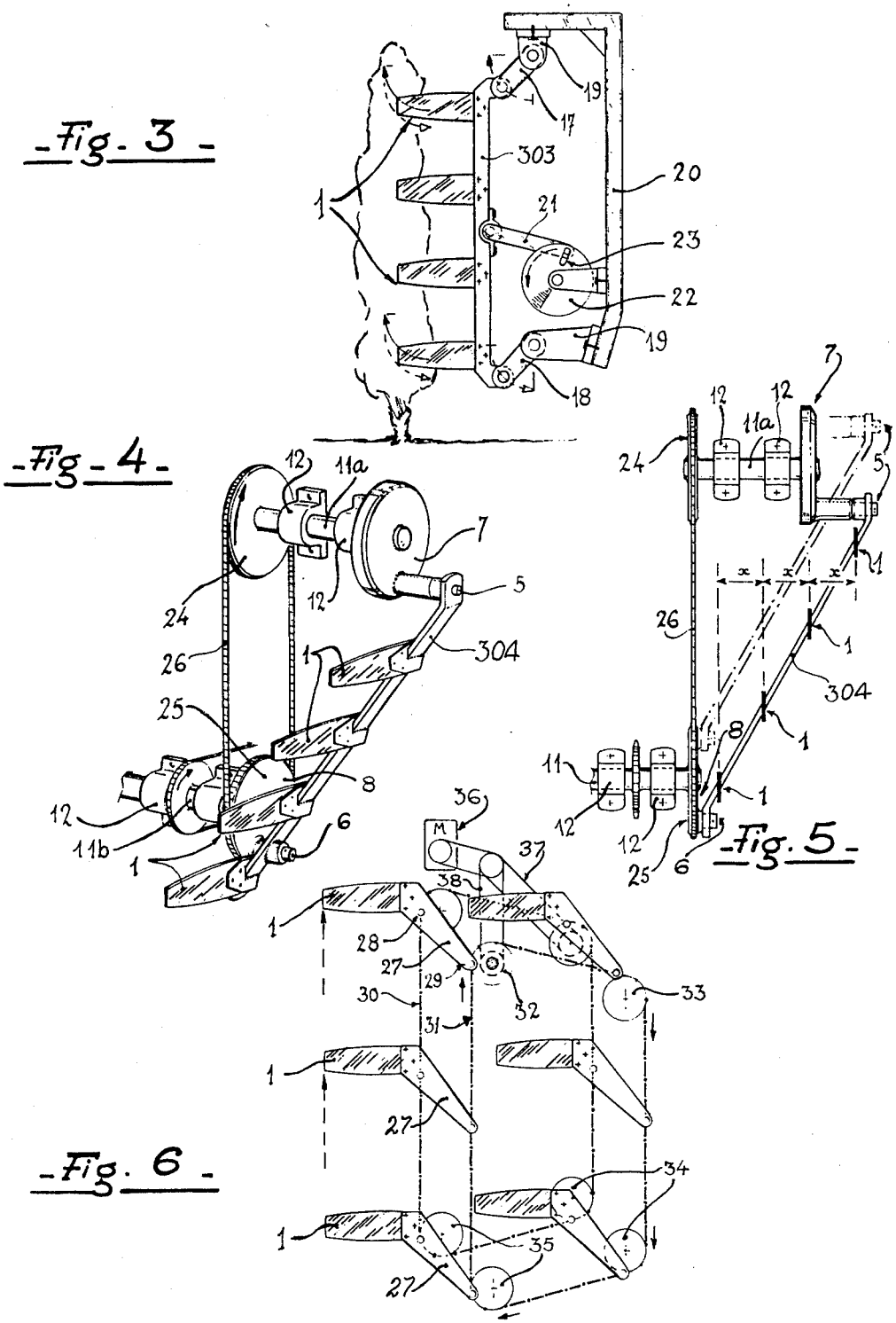

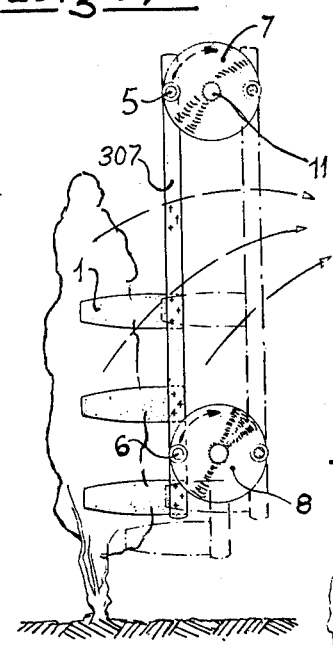
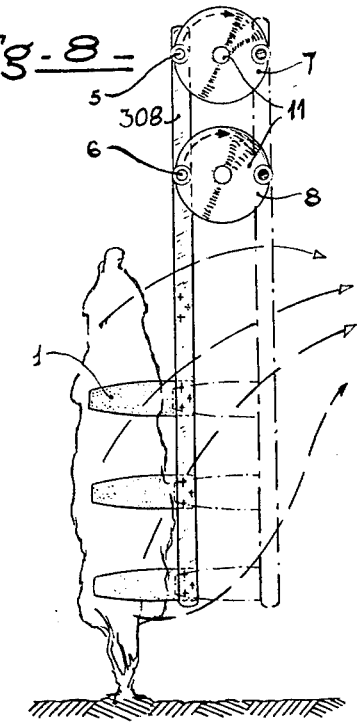
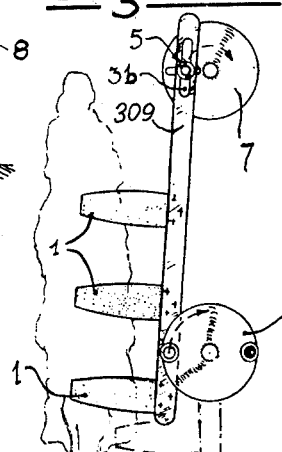
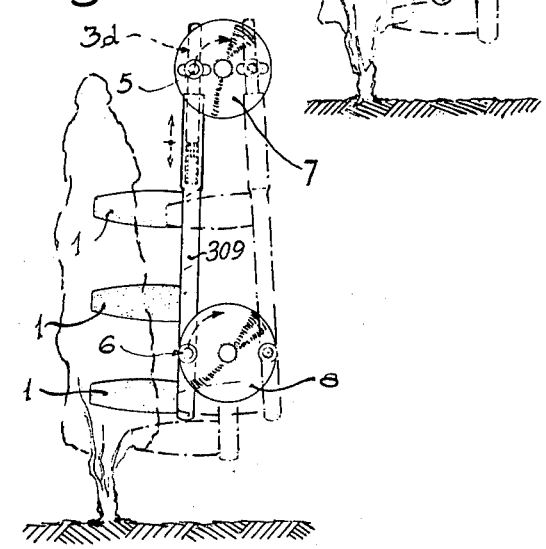
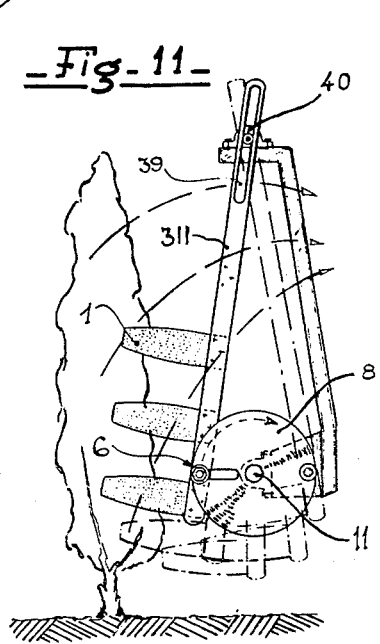

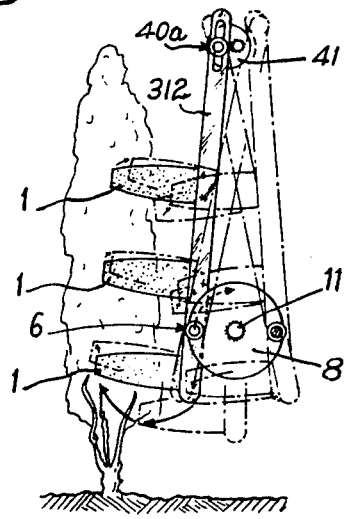
_Fig_-12-
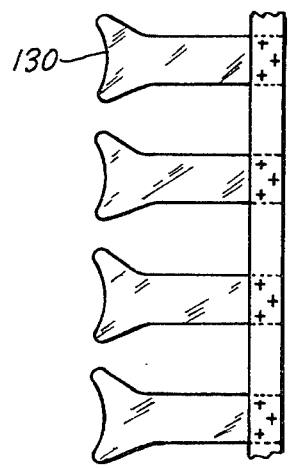
_Fig_-13-
_Fig_-14-
_Fig_-15-
_Fig_-15A-
_Fig_-16-
_Fig_-16A-
_Fig_-17-
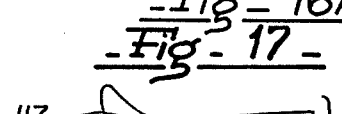
_Fig_-17A-
_Fig_-18-
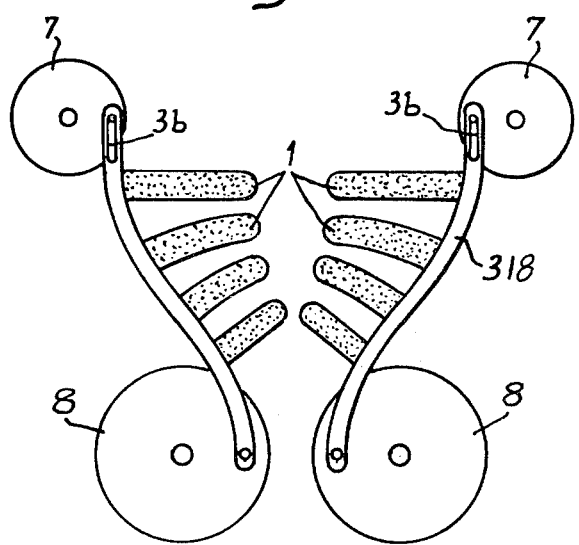

MECHANICAL GRAPE HARVESTING DEVICE

DESCRIPTION OF THE INVENTION

The present invention has as its object a mechanical harvesting device intended to separate from the vine shoots the grapes they bear.

Mechanical harvesting requires, in the first place, picking the grapes and then collecting them while separating them, if necessary, from the leaves detached by the picking means.

It is known to dispose the vine shoots on strung wires which are vibrated by successive shocks whose amplitude and frequency are adjustable. This picking method requires that the wires be regularly strung, that the shoots be closely tied to the wires and, even so, the results of this device are irregular.

It is also known to dispose on either side of the vine several rows of horizontal slats which beat the vegetation so as to cause a succession of shocks which have the effect of detaching the grape berries, the stalks remaining on the shoots and the detached berries being collected by any suitable means. These devices, employed on some machines, require placing the vine on espaliers and present the disadvantage of spoiling the vegetation.

It is further known to dispose several rows of horizontal slats on either side of the vine and to direct the slats so that they form two V's, which pinch the vegetation. As these slats are set in motion in phase opposition, the vegetation is shaken rather violently and rapidly to detach the grape berries. These devices, employed on some machines, also require placing the vines on espaliers and present the disadvantage of shaking the clusters and the vinestocks to the point of causing considerable damage.

It is additionally known to dispose on either side of the grapevine row cylindrical drums having vertical axes, which are equipped with a large number of radial needles which penetrate into the mass of the vegetation. As the drums are vibrated by any suitable means, the needles transmit their vibrations to the grapes, thereby detaching the grape berries. These devices, employed on some machines, give irregular results.

It is also known to dispose one above the other, and on either side of the vine, rotors whose axes are horizontal and parallel to the grapevine row. These rotors are equipped with flexible blades which, during their rotary movement, knock against the vegetation from the bottom up. This not only detaches grape berries but also entire bunches.

However, as the flexible blades are mounted on superposed rotary shafts, it follows that if said blades have a length "d," each blade-holding rotor will have a diameter 2d and should be above the ground at a minimum height equal to at least "d." This gives these machines too great an overall dimension and does not permit collecting the grapes located at low places on the vine. Moreover, the picking by rotary movement does not give good results.

It has been proposed to improve the operation of this kind of device by disposing the blades on a chain arranged between two pulleys. This arrangement still presents the disadvantage of requiring a minimum height equal to the length of the blades while having an overall dimension at least twice that length. It further presents the disadvantage of causing an acceleration of the blades during their passage around the pulleys, with the result that the lower blades penetrate too violently into the vegetation and cause grape berries to burst, causing major losses of juice.

The present invention has as its object a picking device which detaches the grape berries and even entire bunches in a very complete manner and without damaging either the stems or the grapes, and which can be mounted on any of the existing harvesting machines in replacement of the beating, shaking, knocking or vibrating systems used at present which are not fully satisfactory.

This picking device of the present invention is formed by a plurality of flexible blades fixed side by side on at least one substantially vertical support, so as to form a comb, said support being driven by a mechanism which, in a vertical plane, imparts to it a cyclic movement reciprocating up and down, in a direction practically perpendicular to the grapevine row.

As a non-limiting example and to facilitate the understanding of the invention, there are shown in the annexed drawings:

FIG. 1, a front view of a first embodiment of the invention;

FIG. 2, a partial plan view of FIG. 1;

FIG. 3, a partial front view of a second embodiment on a reduced scale from that of FIGS. 1 and 2;

FIG. 4, a partial view in perspective of a third embodiment on a reduced scale from that of FIGS. 1 and 2;

FIG. 5, a plan view of FIG. 4;

FIG. 6, a partial front view of a fourth embodiment on a reduced scale from that of FIGS. 1 and 2;

FIG. 7, a partial front view of a first variant of the embodiment of FIG. 1 on a reduced scale;

FIG. 8, a partial front view of a second variant of the embodiment of FIG. 1 on a reduced scale;

FIG. 9, a partial front view of a third variant of the embodiment of FIG. 1 on a reduced scale;

FIG. 10, a partial front view of a fourth variant of the embodiment of FIG. 1 on a reduced scale;

FIG. 11, a partial front view of a fifth embodiment on a reduced scale;

FIG. 12, a partial front view of a variant of the embodiment of FIG. 11;

FIG. 13, a partial view illustrating another form of realization of the blades;

FIG. 14 is an elevational view of one type of blade;

FIGS. 15-15A, 16-16A, 17-17A are elevational and top views of three other examples of realization of the blades; and FIG. 18, a partial view of a sixth embodiment of the invention.

In FIGS. 1 to 12, only the grape berry picking device is shown to the exclusion of the collecting and conveying means, which may be of any known kind, and which are not included in the scope of the present invention.

Figure 1:
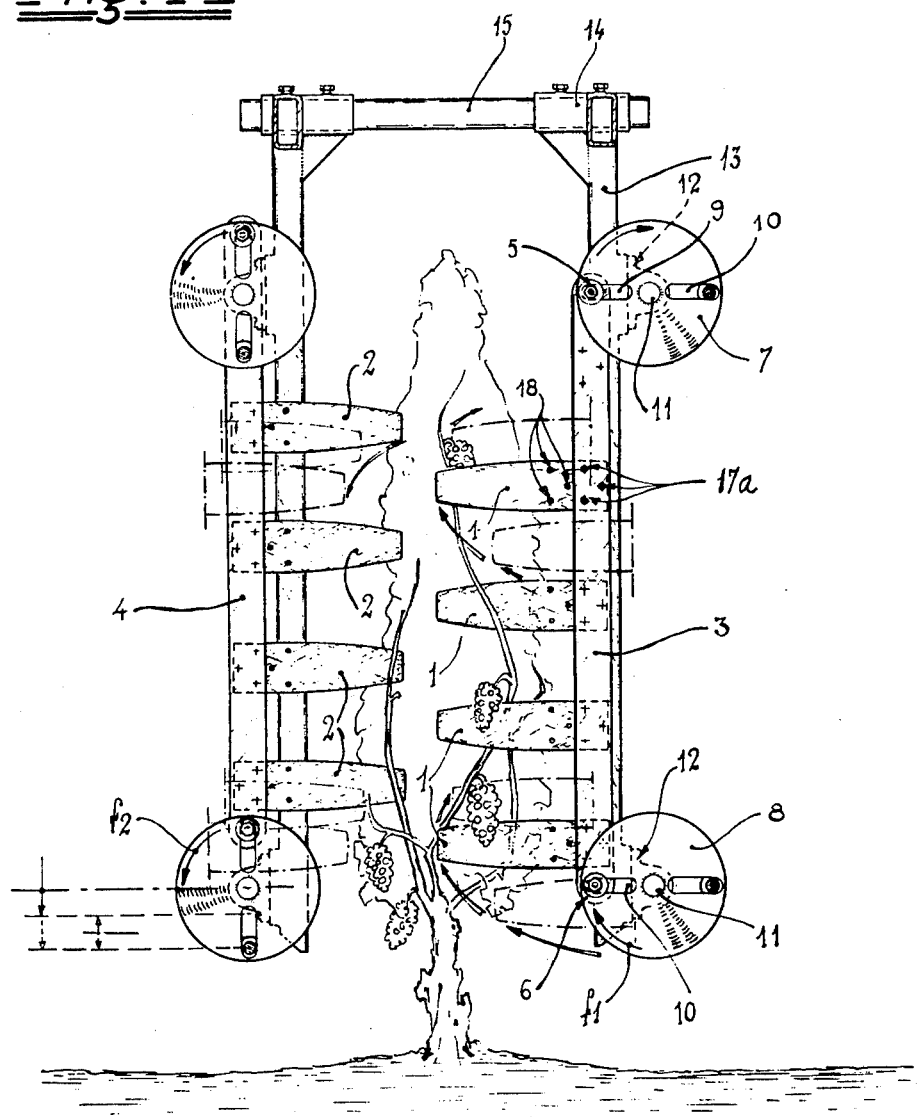

In general, the picking device of FIG. 1 could be moved by a tractor or other vehicle (not shown) along a row of grapevines as the picking operation takes place.

Figure 2:
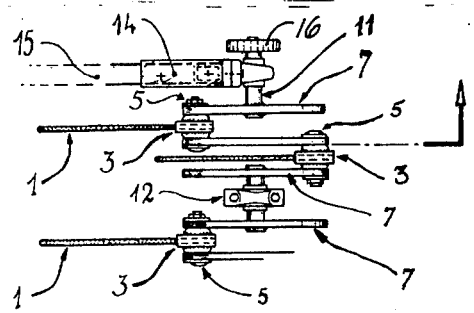

Referring to FIGS. 1 and 2, it is seen that the picking means are formed by horizontal blades 1 made of rubber, or other suitable material such as plastic, which are flexible in the horizontal direction while being relatively rigid in the vertical direction.

As an example, they may be 1 cm thick by 5 cm wide and 30 cm long.

The blades 1 are fastened to a support 3 so as to be parallel to one another and the blades 2 are fastened in the same manner to a support 4, so that the blades 1 and support 3 as well as the blades 2 and support 4 constitute two combs facing each other.

The support 3 is carried at its two ends by two crankpins 5 and 6 secured on disks 7 and 8. Preferably, as is shown, the crankpins 5 and 6 are placed in radial slots 9 and 10 so that the diameter of the circular movement of support 3 can be varied. The disks 7 and 8 are mounted on axles 11 carried by bearings 12 secured on a frame. Preferably the frame comprises vertical beams 13 secured to horizontal beams 15 by sleeves 14 which permit adjusting the spacing thereof.

Referring to FIG. 2, it is seen that preferably a plurality of disks 7–8 are provided, the crankpins of which are offset 180° so as to constitute a crankshaft, so that several supports, here shown as two, with blades 1 mounted thereon, can be driven in common. The disks 7-8 are driven by any suitable means, for example, by a pinion 16 which itself is powered from a motor, belt drive, etc. (not shown). Supports 4 for the blades 2 are mounted and driven in the same way as the supports 3. The description therefore is not repeated.

When the disks 7–8 are driven in the direction indicated by the arrows $f_1$ and $f_2$, the supports 3 and 4 move in parallel paths like connecting rods and the blades 1 and 2 advance to and rise upwardly through the vegetation, then withdraw from the vegetation and descend. Tests have shown that during their movement into the vegetation the blades 1 and 2 of the combs strip the vegetation and detach grape berries and entire bunches, without causing any damage and in a very complete manner.

It also should be noted that on the upward movement in a vertical plane perpendicular to the grapevine row there is superposed the longitudinal movement of the vehicle carrying the picking and collecting means.

As seen in FIG. 1, the blades 1 and 2 are fastened to the supports 3 and 4 by any suitable means such as, for example bolts 17a and the blades have several pairs of apertures 18 so that their position relative to supports 3 and 4 can be adjusted as desired. Thus, by adjusting the position of the blades 1 and 2 and the position of the crankpins 5 and 6 on the disks 7 and 8, the penetration of the blades into the vegetation can be adjusted. Moreover, the lower disks such as 8 can be practically at ground level, thereby permitting collection of the grapes that are very low.

FIGS. 7 to 10 show further embodiments of the device described in FIGS. 1 and 2. Referring to FIGS. 7 and 8, it is seen that the crankpins 5 and 6 can be placed at any point on the support 307 and not only at their two ends as is shown FIGS. 1 and 2. Only one support 307, corresponding to support 3 of FIGS. 1 and 2, is shown. A second support, corresponding to support 4, can be provided.

Referring to FIGS. 9 and 10, it is seen that one can have different diametrical positions for the crankpins 5 and 6, the crankpin 5 describing for example a circle of smaller diameter than that described by crankpin 6. In this case, the support 309 does not remain strictly parallel to itself in the course of its movement, but rocks a little in the vertical plane, thereby adding a digging effect to the movement of the blades 1. In this case the support 309 has a telescoping element 3d (FIG. 9) or a slot 3b in which the crankpin 5 moves (FIG. 10). Again, only one support is shown.

FIG. 3 represents a further embodiment of the device according to the invention. Referring to this figure, it is seen that the support 303 is suspended from two side-pieces 17 and 18, pivotally carried by brackets 19 integral with a chassis 20. The support 303 is connected, in addition, to a connecting rod-crank assembly 21 and 22. When the disk 22 is set in rotation, the support 303 (and hence the blades 1) is urged in a reciprocating movement along an arc of circle defined by the end of the side-pieces 17 and 18. Preferably the coupling joint between the connecting rod 21 and the disk 22 is adjustable by means of an opening or slot 23, whereby the amplitude of movement of the support 303 and the combs 1 that it carries can be varied.

In the example shown in FIG. 3, the side-pieces 17 and 18 are of equal length, but they can be of different lengths, for example side-piece 17 being shorter. In this case, the support 303 does not remain strictly parallel to itself in the course of its movement, but rocks a little in the vertical plane, thereby adding a digging effect to the movement of the blades 1.

When the blades 1 and 2 are carried by a vertical support 3 or 4 such as in FIGS. 1 and 2, it may happen that a bunch, detached by a high blade, strikes against several lower blades during its fall, with the result that grape berries burst and losses of juice are caused. To eliminate this disadvantage, it can be arranged, according to a third embodiment shown in FIGS. 4 and 5, that the support 304 is oblique in the vertical plane parallel to the row of vines. In this case, the upper shaft 11a on which disk 7 is mounted is longer than the lower shaft 11b and the rotation of the two disks 7 and 8 is synchronized by means of two pulleys 24 and 25, connected by a belt or chain 26, the pulley 25 possibly being the same element of structure as the disk 8.

Although not shown, it is possible to place the crankpins 5 and 6 at different diameters and to give to the support 304 a form similar to what is described in FIG. 9 or 10.

FIG. 6 represents a fourth embodiment according to which the blades 1 are carried by supports 27, which are rotatably connected, at two points 28 and 29, to two parallel chains 30 and 31 each of which run over an assembly of four pinions 32, 33, 34 and 35. A pinion of each chain is driven by a motor 36 by means of chains 37 and 38. Owing to this arrangement, the blades 21, while remaining parallel to themselves, carry out an upward and straight movement inside the vegetation, a substantially horizontal retracting movement, a straight downward movement outside the vegetation, and then a straight and substantially horizontal movement of penetration.

Although this has not been shown, the chains 30 and 31 can be placed in oblique planes so as to obtain the same advantages as those described in connection with the embodiment of FIGS. 4 and 5.

In the same manner, the two brackets 19 of FIG. 3 can be shifted so that the support 303 is oblique.

FIG. 11 shows a fifth embodiment of the invention according to which the support 311 has a single lower crankpin 6, connected to a single disk 8, the upper end support 311 having an elongated opening 39 in which slides a fixed nipple 40. The disk 8 and support 311 then constitute a connecting rod-crank assembly and the support 311 is urged in a movement in the course of which it reciprocates while rocking. As in all preceding cases, the amplitude of the movement can be adjusted by changing the position of the crankpin 6 on disk 8 and the extension of the blades with respect to the support 311 is adjustable.

FIG. 12 represents a variant of the embodiment of FIG. 11, according to which the crankpin 40a, instead of being fixed, is mounted on an eccentric 41 driven at a different speed from that of disk 8 so as to add a kind of shaking movement to the digging movement of support 312.

FIG. 13 represents a variant of the shape of the blades 130 which have a form resembling a Y.

It is evident that, depending on the density of the vegetation and the form of the column of the rows of vines, several combs can be placed side by side, as desired, and that one can use either combs on one side only or combs facing each other. Also, when there are several combs, their crankpins can be adjusted to different positions and the blades to different lengths so that each comb strips a different zone of vegetation.

In all examples shown in the various figures, except FIG. 6, the support or supports on which the blades are supported is straight. It is, however, possible according to the present invention to arrange the blades on supports having any desired form so as to better adapt the zone stripped by the blades to the form of the vines.

FIG. 18 represents another embodiment more particularly intended for goblet-shaped vines. In this case the supports 318 are no longer straight but have a form approximately corresponding to the form of the vinestocks and the blades 1 also have forms and dimensions different from one another so as to penetrate into the mass of the vegetation.

FIG. 14 and FIGS. 15-15A, 16-16A and 17-17A show other shapes for the blades. As is shown in FIG. 14, the upper edge of the blade 114 may have notches 114a similar to sawteeth. FIGS. 15-15A; show a blade 115 having a wavy profile while remaining plane. FIGS. 16-16A show a blade 116 having a wavy profile which is also wavy in the vertical direction. The wave or undulation may have notches as FIGS. 17-17A show, the end of a blade 117 being bent back bill-shaped.

What is claimed:

1. A mechanical grape harvesting device adapted for detaching grapes or berries directly from vertically extending vines as the device moves along rows of vines comprising:
    vertically extending support means,
    a plurality of elongated blades mounted one above the other on said support means and extending therefrom in a generally horizontal direction, each of said blades being of a resilient material which is flexible in a horizontal direction along the direction of motion of the device and substantially rigid in a vertical direction,
    and drive means connected to said support means for providing a cyclical vertically reciprocating and horizontally translational motion thereto to move the blades while maintained in a substantially horizontal position in a closed curve path first to penetrate into the vegetation for a distance at least to the vertical medial plane of the vertically extending vines, then in a generally vertical first direction through the vegetation during which the blades contact the grapes or berries and to strip them directly from the vines, then outwardly from the vegetation and then in a generally vertical second direction opposite to said first direction, the horizontal flexibility of the blades permitting them to bend as they contact the vines and vegetation while the device is normally moving along a row of vines.

2. A device according to claim 1 wherein said support means is generally vertical.

3. A device according to claim 1 wherein said support means is oblique in a vertical plane parallel to the row of vines.

4. A device according to claim 1 wherein said drive means includes a pair of crank means connected to said support means, and means for rotating said crank means and the support means to thereby move the blades to penetrate into the vegetation and move upward, to retreat from the vegetation and, then to move away from the vegetation and descend.

5. A device according to claim 4 wherein a said crank means is disposed adjacent each end of said support means.

6. A device according to claim 4 wherein said crank means is disposed at two intermediate points of said support means.

7. A device according to claim 4 wherein said two crank means are disposed at two adjacent points of said support means.

8. A device according to claim 4 wherein each of said crank means includes a disk mounted for rotational movement, a crankpin mounted on each of said rotary disks, each of said crankpins connected to said support means.

9. A device according to claim 8 in which the crankpins are mounted on the disks by means capable of varying their distance relative to their center of rotation.

10. A device according to claim 9 in which each of the two crankpins are at equal distances from their respective centers of rotation to move the blades parallel to themselves during their movement.

11. A device according to claim 9 in which the crankpins are mounted at different distances from their respective centers of rotation and the disks rotate at the same speed so that the blades have a rocking movement in the vertical plane which superposes itself on their cyclic reciprocating and translational movement.

12. A device according to claim 11 wherein said support includes means for compensating for the variation of the distance separating two crankpins.

13. A device according to claim 12 wherein said compensating means comprises an opening in said support means in which said crankpin slides.

14. A device according to claim 1 wherein said support means is generally vertical and wherein said support means is carried at its lower end by a crankpin and is slidingly mounted at its upper end to form a connecting rod-crank handle assembly to also impart a digging movement to the blades.

15. A device according to claim 14 further comprising a variable position slide block at the upper end of said support means.

16. A device according to claim 15 wherein said crankpin is secured to a rotary disk in a displaceable manner so that the distance of the crankpin from the center of rotation can be varied.

17. A device according to claim 14 wherein the upper end of the connecting rod has a longitudinal opening in which slides a nipple.

18. A device according to claim 15 wherein the slide-block of variable position is formed by a nipple carried by an eccentric device urged in a rapid movement to impart a shaking movement to the blades which superposes itself on the digging movement.

19. A device according to claim 1 wherein said blade support means is curved to correspond to the form of the vines to be stripped by the horizontally flexible blades.

20. A device according to claim 1 further comprising means for fastening each of said blades to its support with a selectable length for each of said blades.

21. A device according to claim 1 in which each of the blades has a pair of prongs at its end.

22. A device according to claim 1 in which at least some of the blades have a notched upper edge.

23. A device according to claim 1 in which at least some of the blades have wavy edges.

24. A device according to claim 1 in which at least some of the blades have a wavy surface.

25. A device according to claim 24 in which the waves of the surface include notches.

26. A device according to claim 1 in which at least some of the blades are bent back bill-shaped at their end.

27. A device as in claim 1 wherein said drive means includes a pair of disks connected in spaced relationship to said support means, and means for rotating each of said disks with respect to said support means to provide a generally circular path for each of said blades while maintaining the blades substantially horizontal.

28. A device according to claim 27 wherein said support means comprises a plurality of separate members connected between two parallel chains moving at the same speed.

29. A device according to claim 28 wherein said drive means move said chains in a quadri-lateral path to cause the blades to penetrate substantially horizontally into the vegetation, rise therein substantially vertically, then disengage therefrom horizontally and descend vertically.

* * * * *